United States Patent
Takeuchi et al.

(10) Patent No.: US 11,131,817 B2
(45) Date of Patent: Sep. 28, 2021

(54) MULTI-FIBER CABLE

(71) Applicant: Go!Foton Holdings, Inc., Somerset, NJ (US)

(72) Inventors: Kenichiro Takeuchi, North Brunswick, NJ (US); David Zhi Chen, Dallas, TX (US); Haiguang Lu, Los Altos, CA (US)

(73) Assignee: Go!Foton Holdings, Inc., Somerset, NJ (US)

(*) Notice: Subject to any disclaimer, the term of this patent is extended or adjusted under 35 U.S.C. 154(b) by 0 days.

(21) Appl. No.: 16/729,637

(22) Filed: Dec. 30, 2019

(65) Prior Publication Data

US 2020/0355882 A1 Nov. 12, 2020

Related U.S. Application Data

(60) Provisional application No. 62/845,513, filed on May 9, 2019.

(51) Int. Cl.
*G02B 6/44* (2006.01)
*G02B 6/38* (2006.01)

(52) U.S. Cl.
CPC .............. *G02B 6/441* (2013.01); *G02B 6/38* (2013.01); *G02B 6/443* (2013.01); *G02B 6/4403* (2013.01); *G02B 6/4482* (2013.01)

(58) Field of Classification Search
CPC ........ G02B 6/441; G02B 6/38; G02B 6/4403; G02B 6/443; G02B 6/4482
USPC .......................................................... 385/100
See application file for complete search history.

(56) References Cited

U.S. PATENT DOCUMENTS

| | | | |
|---|---|---|---|
| 4,952,020 A * | 8/1990 | Huber | G02B 6/4403 174/117 R |
| 4,957,344 A * | 9/1990 | Chesler | B65H 55/04 385/123 |
| 9,958,626 B2 | 5/2018 | Kokura | |
| 10,101,549 B2 | 10/2018 | Hoshino et al. | |
| 10,185,110 B2 | 1/2019 | Kaneko et al. | |
| 10,247,900 B2 | 4/2019 | Murata et al. | |
| 2011/0110635 A1 | 5/2011 | Toge et al. | |
| 2011/0262148 A1 | 10/2011 | Weimann | |

(Continued)

FOREIGN PATENT DOCUMENTS

| | | | |
|---|---|---|---|
| JP | 2011221199 A * | 11/2011 | ............... G02B 6/44 |
| JP | 2011221199 A | 11/2011 | |
| WO | 2019011417 A1 | 1/2019 | |

OTHER PUBLICATIONS

International Search Report with Written Opinion for Application No. PCT/US2020/027200 dated Jul. 7, 2020, 15 pages.

*Primary Examiner* — Jerry M Blevins
(74) *Attorney, Agent, or Firm* — Lerner, David, Littenberg, Krumholz & Mentlik, LLP

(57) ABSTRACT

A multi-fiber cable includes a plurality of optical fibers and an adhesive. The adhesive may be applied along a longitudinal length of the multi-fiber cable in a continuous or substantially continuous manner. The adhesive may be applied in a continuous curved shape, such as sinusoidal. The multi-fiber cable may further include an outer sheath and/or a strength member. The multi-fiber cable may be formed using an adhesive dispenser and a curing device. The curving device may be a light guide coupled to the adhesive dispenser.

23 Claims, 11 Drawing Sheets

(56) References Cited

U.S. PATENT DOCUMENTS

| | | | |
|---|---|---|---|
| 2014/0174650 A1* | 6/2014 | Brizius | C08F 299/02 |
| | | | 156/275.5 |
| 2016/0161697 A1* | 6/2016 | Lang | G02B 6/4482 |
| | | | 385/112 |
| 2016/0266343 A1 | 9/2016 | Weimann et al. | |
| 2017/0219790 A1 | 8/2017 | Debban et al. | |
| 2017/0219792 A1 | 8/2017 | Debban et al. | |
| 2017/0235068 A1 | 8/2017 | Debban et al. | |
| 2018/0031792 A1 | 2/2018 | Risch et al. | |
| 2018/0039034 A1* | 2/2018 | Kodera | G02B 6/4225 |
| 2018/0039035 A1 | 2/2018 | Chiasson et al. | |
| 2018/0149821 A1 | 5/2018 | Bringuier et al. | |
| 2018/0203197 A1* | 7/2018 | Blazer | G02B 6/443 |
| 2018/0252882 A1 | 9/2018 | Baucom et al. | |
| 2018/0321455 A1 | 11/2018 | Cignarale et al. | |
| 2019/0049681 A1 | 2/2019 | Bookbinder et al. | |
| 2019/0064469 A1 | 2/2019 | Kumar et al. | |
| 2019/0250347 A1 | 8/2019 | Fallahmohammadi et al. | |
| 2020/0081186 A1* | 3/2020 | Wu | G02B 6/443 |

\* cited by examiner

MULTI-FIBER CABLE

CROSS REFERENCE TO RELATED APPLICATION

The present application claims the benefit of the filing date of U.S. Provisional Patent Application No. 62/845,513 filed May 9, 2019, the disclosure of which is hereby incorporated herein by reference.

BACKGROUND OF THE INVENTION

Optical fibers are increasingly being used in the electronic and telecommunication fields. Instead of using a plurality of single optical fibers, a multi-fiber cable or fiber ribbon may be used. A multi-fiber cable or fiber ribbon may allow for a greater density of optical fibers within a given space. For example, a plurality of optical fibers may be bonded or adhered together to form a multi-fiber cable or fiber ribbon. Once bonded, the multi-fiber cable may be planar or, in some instances, it may be rolled. In either instance, the multi-fiber cable may be configured to fit within a tube. In some instances the optical fibers may be bonded over their entire length. In some other instances, the optical fibers may not be bonded over their entire length, but, rather, intermittently.

BRIEF SUMMARY OF THE INVENTION

It has been recognized that the density of fibers in a multi-fiber cable or fiber ribbon can be increased by overcoming drawbacks associated with previous bonding techniques. In this regard, the present technology was conceived. According to the present technology, a multi-fiber cable may include a plurality of optical fibers and an adhesive. The adhesive may be applied a longitudinal length of the multi-fiber cable in a continuous or substantially continuous manner. The adhesive may be applied in a curved shape along the longitudinal length of the multi-fiber cable. The curved shape may be sinusoidal or substantially sinusoidal. The curved shape may extend from a first outermost optical fiber to a second outermost optical fiber. A cross-section of the multi-fiber cable, taken transverse to the longitudinal length, may include an adhesive coupling no more than two of the optical fibers comprising the multi-fiber cable.

In some instances, there may be an adhesive dispenser configured to apply the adhesive in a continuous or substantially continuous manner There may be a curving device for curing the adhesive. The curing device may be a light guide. The light guide may be coupled to the adhesive dispenser. In some instances, the curing device may be a light chamber.

Another aspect provides a method of forming a multi-fiber cable. The method includes arranging a plurality of optical fibers and applying, by a dispenser, an adhesive along a longitudinal length of the plurality of optical fibers in a continuous or substantially continuous manner. The adhesive may be applied in a continuous curved shape along the longitudinal length of the multi-fiber cable. The curved shape may be sinusoidal. The method may further include rolling the plurality of optical fibers in a direction transverse to the longitudinal length of the plurality of optical fibers. A cross-section of the multi-fiber cable transverse to the longitudinal length may include an adhesive coupling no more than two of the optical fibers.

According to one aspect of the disclosure, a multi-fiber cable includes a plurality of optical fibers and an adhesive. The optical fibers may be arranged in parallel. There may be a first outermost optical fiber positioned at a first outermost position along a direction transverse to a longitudinal length and a second outermost optical fiber positioned at a second outermost position along the direction transverse to the longitudinal length.

The adhesive may be a polymer. The adhesive may be applied along a longitudinal length of the multi-fiber cable in a continuous or substantially continuous manner, such that a cross-section of the multi-fiber cable taken transverse to the longitudinal length will include adhesive coupling no more than two of the optical fibers. The adhesive may be applied in a continuous curved shape along the longitudinal length of the multi-fiber cable. The continuous curved shape may be sinusoidal or substantially sinusoidal. The continuous curved shape may extend from the first outermost optical fiber to the second outermost optical fiber.

The multi-fiber cable may be configured to be rolled in a direction transverse to the longitudinal length of the plurality of optical fibers. The multi-fiber cable may further include an outer sheath. The outer sheath may include printing. The multi-fiber cable may include a strength member. The strength member may be glass fiber yarn.

Another aspect of the disclosure is directed to a method of forming a multi-fiber cable. The method may include arranging a plurality of optical fibers and applying, by a dispenser, and adhesive along a longitudinal length of the plurality of optical fibers. The adhesive may be applied in a continuous or substantially continuous manner, such that a cross-section of the multi-fiber cable transverse to the longitudinal length will include adhesive coupling no more than two of the optical fibers. The adhesive may be applied in a continuous curved shape along the longitudinal length of the cable. The continuous curved shape may be sinusoidal or substantially sinusoidal. The plurality of optical fibers may be rolled in a direction transverse to the longitudinal length of the plurality of optical fibers.

Yet another aspect of the present disclosure is directed to a system for forming a multi-fiber cable. The system may include an adhesive dispense and a curing device. The adhesive dispenser may be configured to apply adhesive to a plurality of optical fibers in a continuous or substantially continuous manner, such that a cross-section of the multi-fiber cable transverse to the longitudinal length will include adhesive coupling no more than two of the optical fiber. The adhesive dispenser may be configured to apply the adhesive in a continuous curved shape along the longitudinal length of the cable. The continuous curved shape may be sinusoidal or substantially sinusoidal.

The curing device may be a light guide. The curing device may be coupled to the adhesive dispense. In some instances, the curving device may be a light chamber.

BRIEF DESCRIPTION OF THE DRAWINGS

By way of description only, embodiments of the present disclosure are described herein with reference to the accompanying figures, in which.

DETAILED DESCRIPTION

Figure 1:
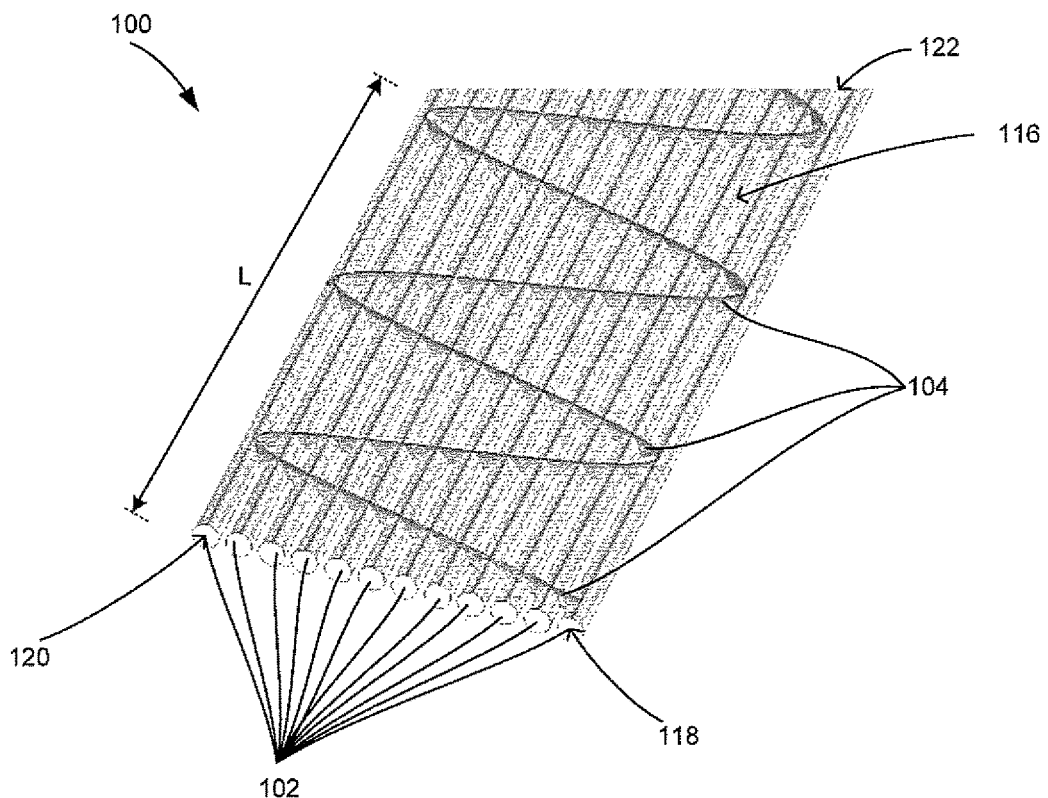
FIG. 1 is a perspective view of a multi-fiber cable with continuous adhesive, in accordance with an embodiment of the present disclosure.
Figure 2A:
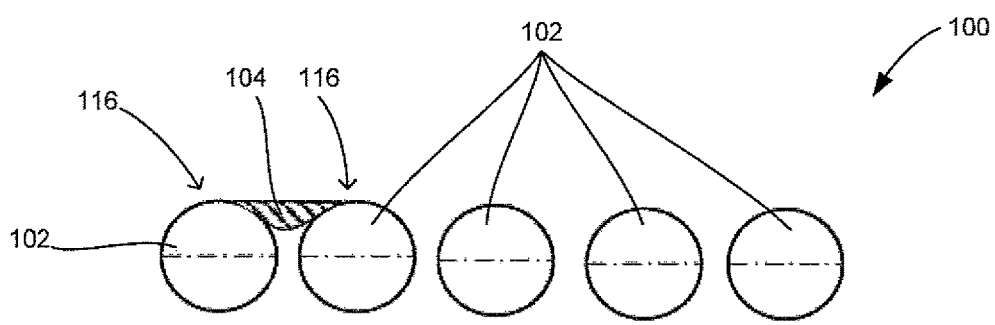
FIG. 2A is a cross-sectional view of the multi-fiber cable, in accordance with an embodiment of the present disclosure.
Figure 2B:
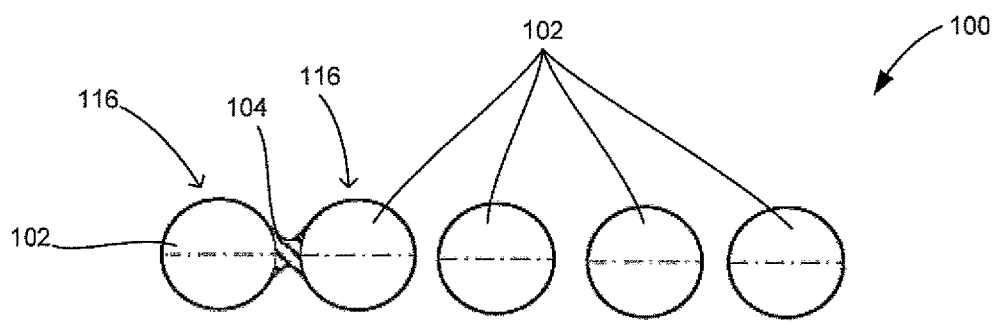
FIG. 2B is a cross-sectional view of another multi-fiber cable, in accordance with an embodiment of the present disclosure.
Figure 3:
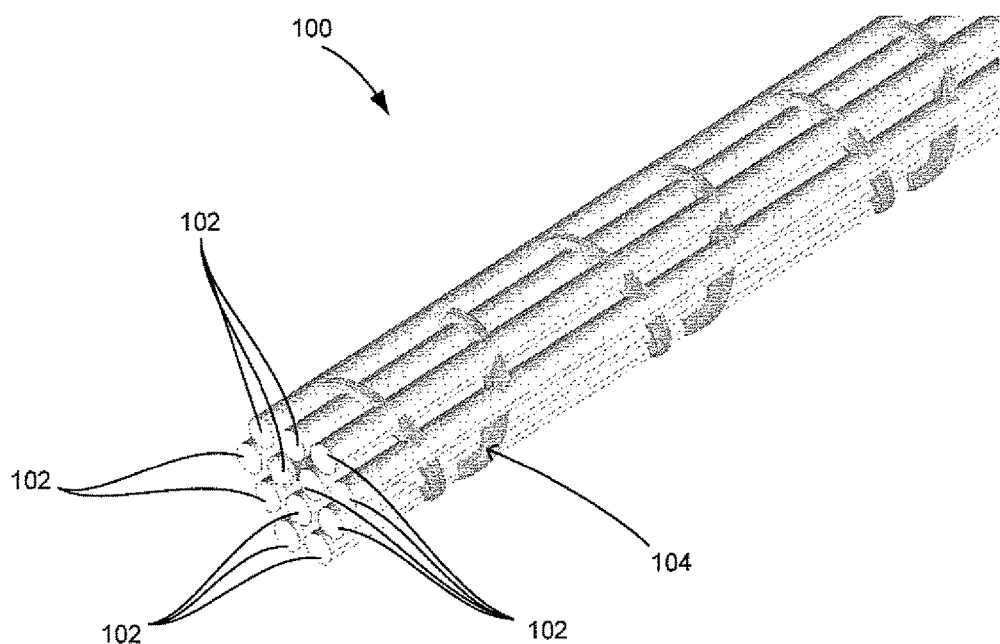
FIG. 3 is a perspective view of a rolled multi-fiber cable, in accordance with an embodiment of the present disclosure.

A multi-fiber cable 100 is described with reference to FIGS. 1-2B. The multi-fiber cable 100 may include a plurality of optical fibers 102 and an adhesive 104. The optical fibers may have a diameter of 200 um. However, 200 um is merely one example. The diameter of each of the plurality of optical fibers may be more or less than 200 um. As shown, there are twelve (12) optical fibers. However, in other examples there may be more than or less than twelve optical fibers. The plurality of optical fibers 102 may be arranged in a parallel or substantially parallel configuration. There may be a first outermost optical fiber 118 positioned at a first outermost position along a direction traverse to the longitudinal length "L" and a second outermost optical fiber 120 positioned at a second outermost position along a direction traverse to the longitudinal length "L." Each of the plurality of optical fibers 102 may have a center. The optical fibers may be positioned such that the distance from the center from one optical fiber 102 to the center of an adjacent optical fiber 102 may be 250 um. However, 250 um is merely one example. The distance between centers of adjacent optical fibers may be more or less than 250 um.

The plurality of optical fibers 102 may be connected using an adhesive 104. The adhesive 104 may be, for example, a polymer based adhesive. In some instances the adhesive 104 may be polyurethane, acrylic, epoxy, silicone, rubber based, etc. The adhesive 104 may be flexible to facilitate manipulation of the multi-fiber cable 100. For example, the multi-fiber cable 100 may be rolled in order to change the dimensions of the cable. Alternatively, the multi-fiber cable 100 may be folded, to also change the dimensions of the cable. As shown, the adhesive 104 may have an elasticity best suited for instances in which multi-fiber cable 100 is rolled.

Adhesive 104 may be on only one side of multi-fiber cable 100. For example, as shown in FIG. 1, adhesive 104 may be on only the top surface 116 of the plurality of optical fibers 102 and partially within the cavities or spaces between adjacent optical fibers 102. The adhesive 104 may be applied in a continuous or substantially continuous manner. The adhesive 104 may be applied along a longitudinal length "L" of the multi-fiber cable 100. In some instances, the adhesive 104 extends along the entire longitudinal length "L." In other examples, the adhesive 104 may only extend along a portion of longitudinal length "L." Alternatively, the adhesive 104 may be applied continuously along multiple portions along longitudinal length "L."

The adhesive 104 may be selected to have a desired viscosity. For example, the adhesive 104 may have a high viscosity, as shown in FIG. 2A. A high viscosity adhesive may slow the flow of adhesive 104 in between the plurality of optical fibers 102. Thus, in some examples, when adhesive 104 has a higher viscosity, adhesive 104 may mostly remain on the top surface 116 of the plurality of optical fibers. Alternatively, a lower viscosity adhesive may have a high elasticity. In yet another example where adhesive 104 had a lower viscosity, adhesive 104 may not remain on the top surface 116 of the plurality of optical fibers 102 but, rather, may flow in the cavities or spaces between adjacent optical fibers 102, as shown in FIG. 2B.

Adhesive 104 may be applied in a continuous or substantially continuous curved shape. For example, the curved shape may be sinusoidal or substantially sinusoidal. In other examples, the curved shape may be a parabola or catenary. In yet other examples, the curved shape may be seen as a cosine or tangent curve. The continuous or substantially continuous application of adhesive 104 may constrain the plurality of optical fibers 102.

Adhesive 104 may extend from the first outermost optical fiber 118 to the second outermost optical fiber 120. For example, as shown in FIG. 1, adhesive 104 may start at the first outermost optical fiber 118 such that the first outermost optical fiber 118 and adjacent optical fiber 102 may become coupled. The adhesive 104 may then continue in its curved shaped and extend to the second outermost optical fiber 120. Thus, in some examples, the continuous curved shape of adhesive 104 extends from a first outermost optical fiber 118 to a second outermost optical fiber 120. In some instances, adhesive 104 may start in the cavity 122 between optical fibers 102. Alternatively, adhesive 104 may start at the outermost edge of the first or second outermost optical fibers 118, 120.

Figure 10A:
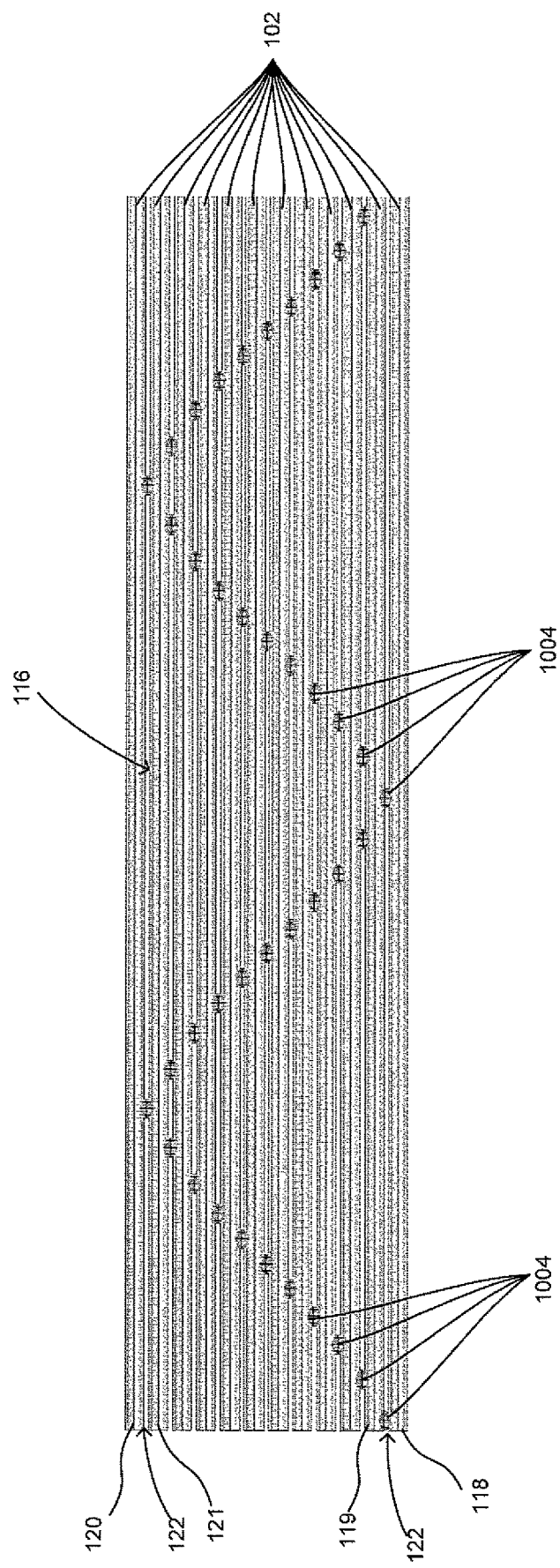
FIGS. 10A and 10B are planar views of a multi-fiber cable with discontinuous adhesive, in accordance with an embodiment of the present disclosure.
Figure 10B:
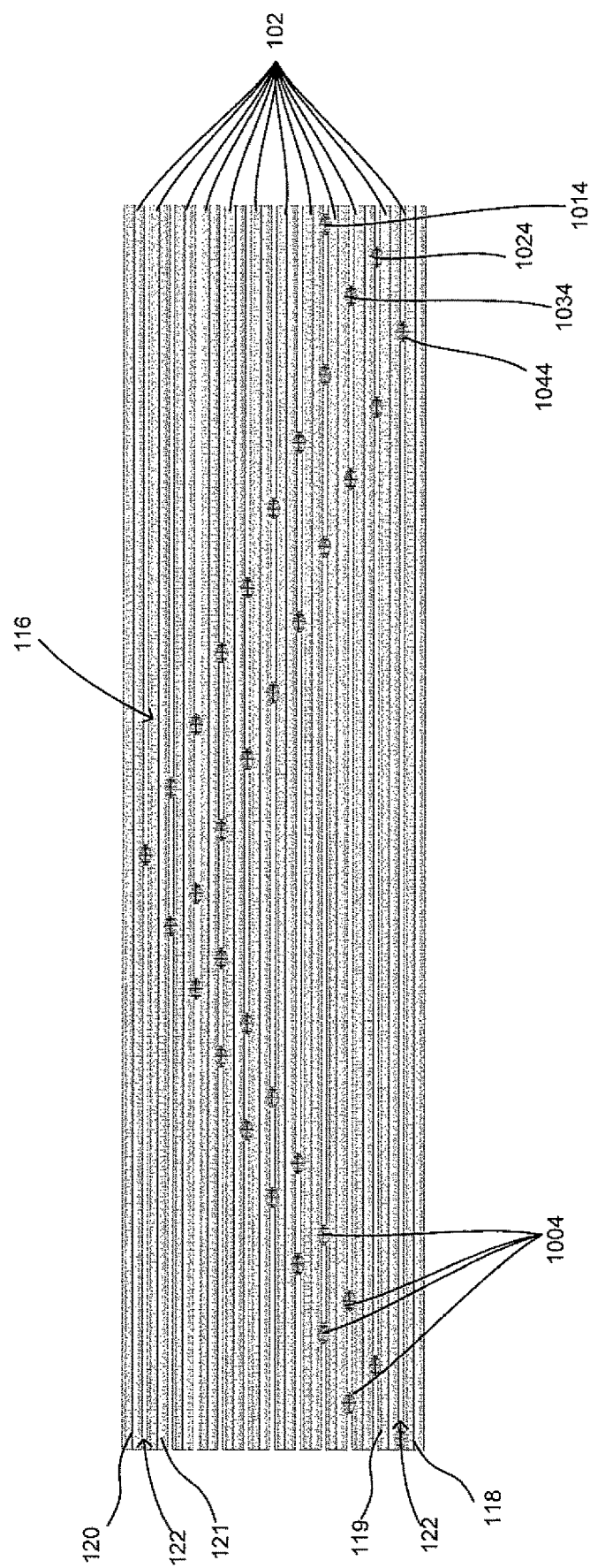
Figure 11:
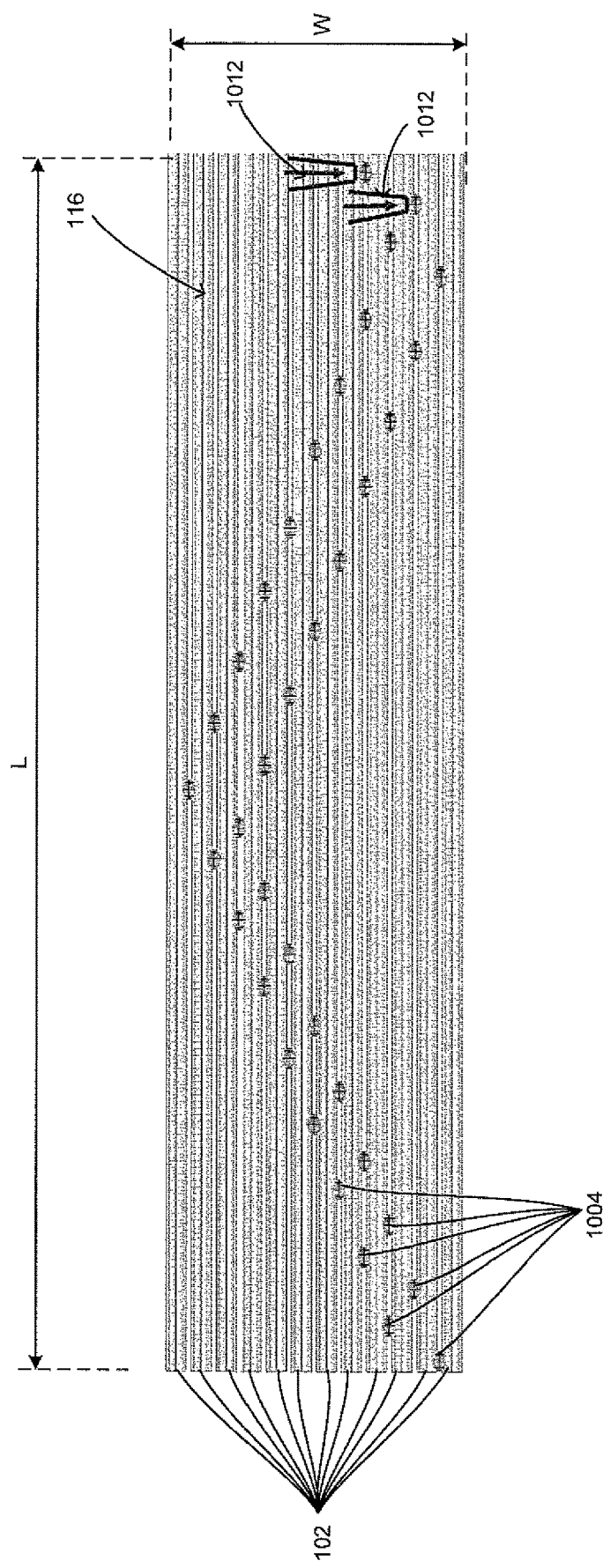
FIG. 11 is a planar view of a multi-fiber cable and an additional system for making the multi-fiber cable, in accordance with an embodiment of the present disclosure.

FIGS. 10A, 10B and 11 show a multi-fiber cable 100 that has a discontinuous adhesive pattern. A discontinuous adhesive pattern may be, for example, adhesive that is broken up into portion or sections. In some examples, the discontinuous adhesive pattern may be a series of dots, spots or dashes along the surface. As shown, adhesive 1004 may be applied as a series or dots or spots on the top surface 116 of the optical fibers 102. Adhesive 1004 may be applied to the space or cavity between each pair of adjacent optical fibers.

In some examples, the adhesive 1004 may be applied to a location where an adjacent pair of optical fibers 102 abut. The adhesive 1004 may not extend across the top surface 116 of each of the plurality of optical fibers 102 between each adhesive 1004 location. For example, the adhesive 1004 may appear as a plurality of spots or dots on the top surface 116 of the multi-fiber cable 100. Thus, the adhesive 1004 may be applied in a discontinuous or substantially discontinuous manner.

Adhesive 1004 may be applied in a continuous or substantially continuous curved shape. For example, the plurality of adhesive 1004 spots may appear to form or follow a sinusoidal or substantially sinusoidal curve. In some examples, the curved shape may be a parabola, catenary, cosine, or zigzag. The curved shape of the adhesive 1004 spots may extend from the first outermost optical fiber 118 to the second outermost optical fiber 120. For example, as shown in FIG. 10A, a first adhesive 1004 spot may be located in the cavity between the first outermost optical fiber 118 and the adjacent optical fiber 119. There may be a plurality of adhesive 1004 spots in the respective cavities between each subsequent pair of adjacent optical fibers such that the adhesive 1004 spots are placed in a curved shape. The curved shape may extend to the adhesive 1004 spot located in the cavity between the second outermost optical fiber 120 and the adjacent optical fiber 121. Thus, in some examples, the continuous curved shape of discontinuous adhesive 1004 spots may extend from the cavity 122 between the first outermost optical fiber 118 and optical fiber 119 to the cavity 122 between the second outermost optical fiber 120 and optical fiber 121.

FIG. 10B illustrates a multi-fiber cable 100 that has a discontinuous adhesive pattern. The discontinuous adhesive pattern may not be a continuous curved shaped. According to some examples, the adhesive pattern may be a period pattern. For example, adhesive spot 1014 may be placed between two adjacent optical fibers. Adhesive spot 1024 may be placed between two adjacent optical fibers 102 distal to adhesive spot 1014. In this example, distal means towards to the first outermost optical fiber 118 and proximal means towards the second outermost optical fiber 120. Adhesive spot 1034 may then be placed proximal to adhesive spot 1024 and adhesive spot 1044 may be placed distal to adhesive spot 1034. Thus, the adhesive spots 1014, 1024, 1034, 1044 as shown in FIG. 10B do not follow a continuous curved pattern. While the discontinuous or periodic adhesive pattern shown in FIG. 10B is described in a sequence of placing adhesive spots 1014, 1024, 1034, 1044, the adhesive spots 1004 may be placed in any order or dispensed in a zig-zag pattern different from that shown or described above so long as the adhesive spots 1004, 1014, 1024, 1034, 1044 are placed such that when a cross-section of the multi-fiber cable 100 is taken transverse to the longitudinal length of the multi-fiber cable 100 at any location along the longitudinal length, the cross-section may include only a single location of adhesive 1004, 1014, 1024, 1034, 1044 coupling two adjacent optical fibers 102. In FIG. 10B the adhesive is applied in a periodic pattern along the longitudinal length of the multi-fiber cable, a first outermost adhesive is applied between the first outermost optical fiber 118 and a first adjacent fiber 119 and a second outermost adhesive is applied between the second outermost optical fiber 120 and a second adjacent fiber 121.

Figure 4:
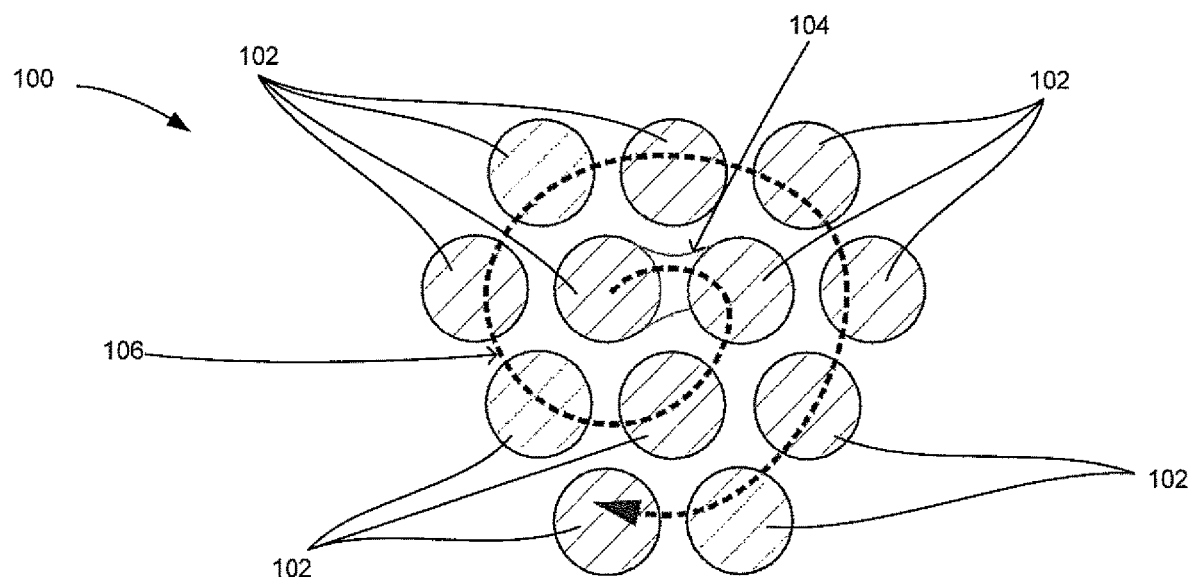
FIG. 4 is a cross-sectional view of a rolled multi-fiber cable, in accordance with an embodiment of the present disclosure.

FIGS. 3-6D show a multi-fiber cable 100 that has been rolled. For example, one of the outermost optical fibers may be rolled in a direction transverse to a longitudinal length of the plurality of optical fibers. For example, the outermost optical fiber may be rolled in a direction 106 toward an adjacent optical fiber until the plurality of optical fibers 102 create a cylindrical or substantially cylindrical shape. In some instances, the outermost optical fiber may be rolled in a direction where the adhesive 104 may be on the inside of the rolled up multi-fiber cable 100. Alternatively, the outermost optical fiber may be rolled in a direction where the adhesive 104 may be on the exterior of the rolled up multi-fiber cable 100. In yet another alternative, as shown in FIG. 4, when the plurality of optical fibers 102 is rolled, the adhesive may be in-between each of the adjacent pair of optical fibers 102.

When a cross-section of the multi-fiber cable 100 is taken transverse to the longitudinal length of the multi-fiber cable 100 at any location along the longitudinal length, the cross-section may include only a single location of adhesive 104 coupling two adjacent optical fibers 102, as seen in FIG. 4. This may, for example, allow for a tighter roll of the plurality of optical fibers 102, as the plurality of optical fibers 102, besides the adjacent pair of optical fibers that are coupled via adhesive 104, may be in contact with adjacent optical fibers. Thus, there may be direct optical fiber 102 to optical fiber 102 contact, allowing for a minimum diameter of the multi-fiber cable 100 when rolled.

When the plurality of optical fibers 102 are flexed or bent in a direction transverse to the longitudinal length of the multi-fiber cable 100, the stress on the plurality of optical fibers 102 may be evenly distributed. For example, each of the plurality of optical fibers 102 may experience the same or substantially the same amount of bending force. In some instances, the plurality of optical fibers 102 may bend simultaneously or substantially simultaneously in the same or substantially the same manner instead of each of the plurality of optical fibers bending independently of one another. This may allow for the multi-fiber cable 100 to have more stability to prevent one of the plurality of optical fibers 102 from kinking, crimping, bending, etc.

According to some embodiments, the multi-fiber cable 100 may be configured to include some space between fibers after rolling. In this manner the resulting cable may be deformable to fit within a structure or space. For example, an external force may be exerted on the multi-fiber cable 100 as the multi-fiber cable 100 is installed. The multi-fiber cable 100 may, for example, be stored in a very small space or may share space with many other cables. In another example, the multi-fiber cable 100 may have to go through a small opening. As the multi-fiber cable 100 is bent, flexed, or manipulated in any way as it is installed, the plurality of optical fibers 102 may be compressed. Thus, the diameter of the multi-fiber cable 100 may be less when an external force is exerted on it than when the multi-fiber cable is in a state of equilibrium, i.e. when no external forces are being exerted on it. The compressed multi-fiber cable 100 with a smaller diameter may be easier to fit within a structure or space due to its smaller diameter.

Figure 5A:
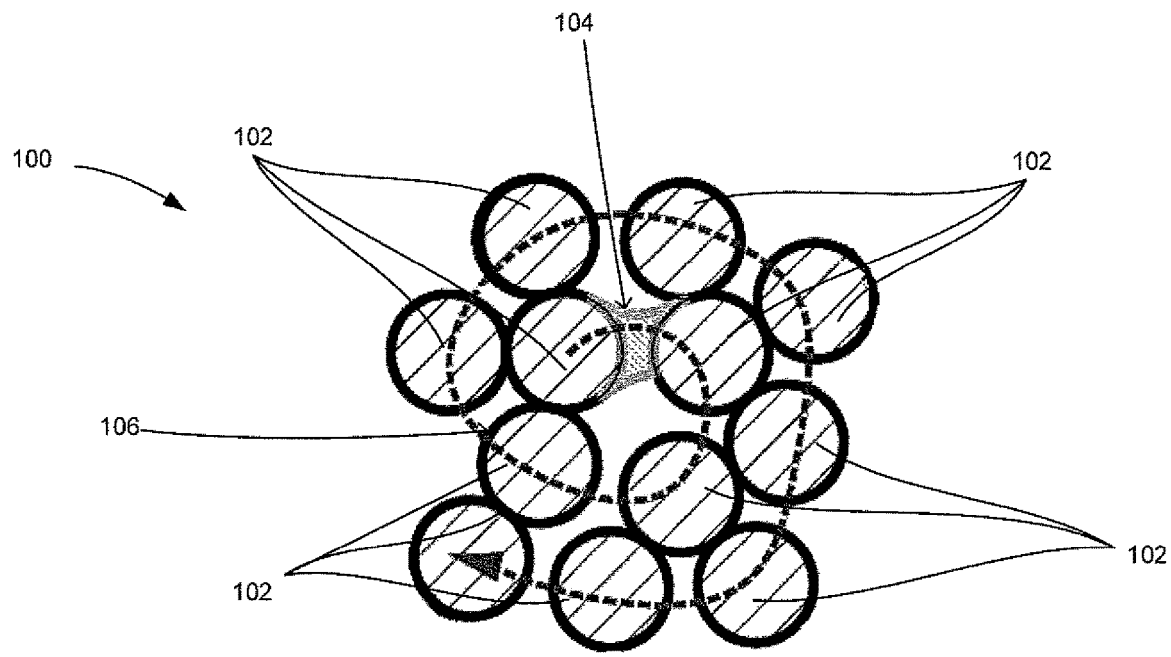
FIG. 5A is a cross-sectional view of another rolled multi-fiber cable, in accordance with an embodiment of the present disclosure.
Figure 5B:
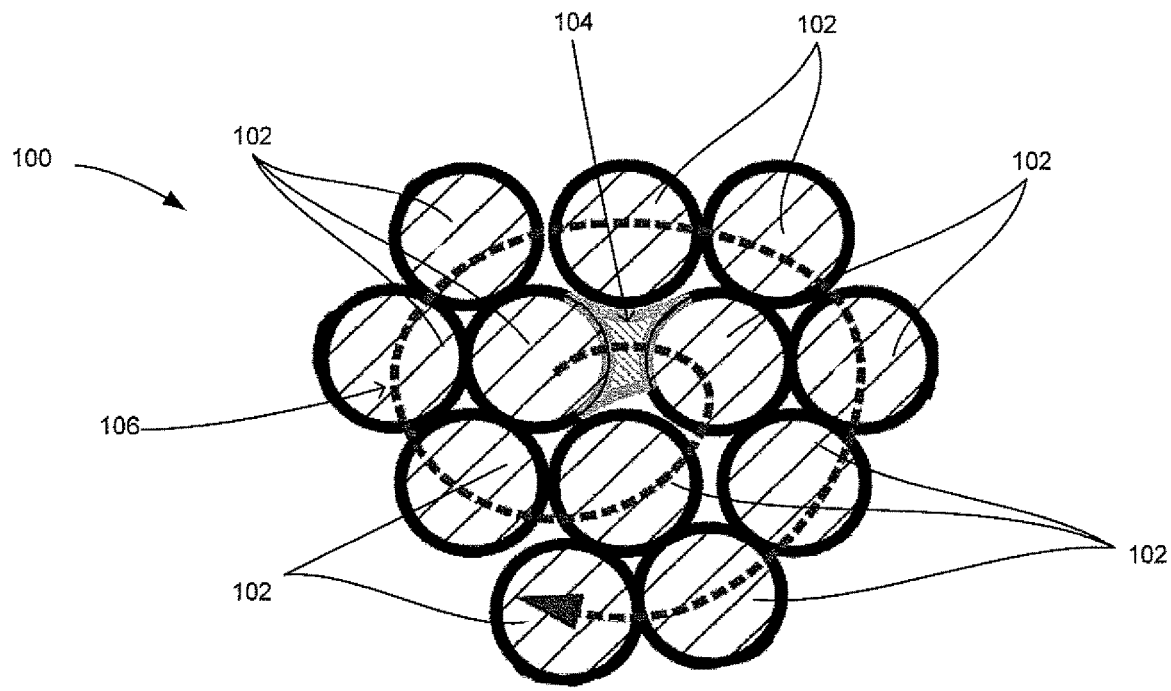
FIG. 5B is a cross-sectional view of another rolled multi-fiber cable, in accordance with an embodiment of the present disclosure.

A multi-fiber cable 100 may include spacing between each of the plurality of optical fibers 102 when rolled, as shown in FIG. 5A. For example, if each of the plurality of optical fibers are 200 micrometers in diameter, there may be 250 micrometer spacing between adjacent optical fibers when the plurality of optical fibers 102 are rolled. In some instances, the multi-fiber cable 100 may experience an external force. For example, the multi-fiber cable 100 may be flexed or bent in a direction transverse to the longitudinal length of the cable 100. The adjacent optical fibers 102 that may be coupled together via adhesive 104 may not compress at the location of the adhesive, but the remainder of the plurality of optical fibers 102 may compress such that adjacent optical fibers 102 become in contact with one-another, as shown in FIG. 5B. The multi-fiber cable 100 may be compressed such that at some points along the longitudinal length of the multi-fiber cable 100, the diameter of the compressed multi-fiber cable 100 may be smaller than the diameter of the multi-fiber cable 100 when the cable is not experiencing an external force.

The multi-fiber cable may further include a strength member. The strength member may be, for example, glass fiber yarn, Kevlar, etc. The strength member may provide protection for the cable by distributing pulling forces that are exerted on the cable. The strength member may be incorporated into the multi-fiber cable in various ways. FIGS. 6A-6D show four different ways in which the strength member may be used in the multi-fiber cable. These are, however, exemplary and not meant to show every way in which the strength member may be used in conjunction with the multi-fiber cable. Moreover, the strength member, as shown, is not drawn to scale but, rather, has been enlarged for easy understanding.

In some instances, when the plurality of optical fibers are rolled, there may be a space spanning the longitudinal length in the center of the roll. Thus, to minimize the size of the multi-fiber cable, the strength member may be located in the center space that may otherwise be empty or void. For example, in FIG. 6A, the plurality of optical fibers 202 may be rolled around the strength member 224, as shown, such that strength member 224 is at the center of multi-fiber cable 200. This may allow for the diameter of the multi-fiber cable to be reduced as compared to the strength member being located or applied elsewhere. As can be seen in the cross-section taken transverse to the longitudinal length of multi-fiber cable 200, there may be only one location of adhesive 204.

Figure 6A:
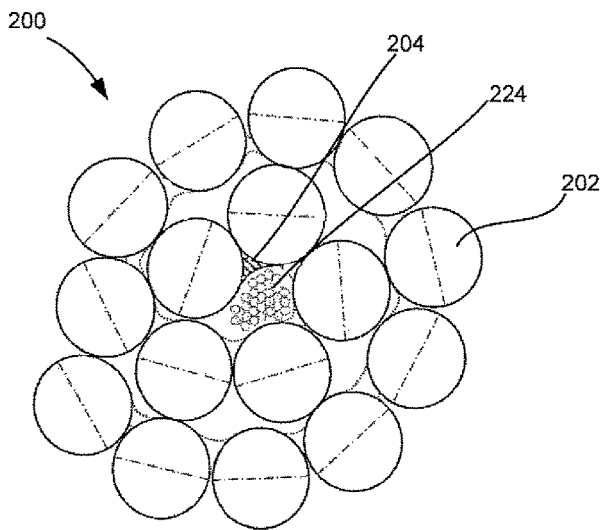
FIG. 6A is a cross-sectional view of another rolled multi-fiber cable, in accordance with an embodiment of the present disclosure.
Figure 6B:
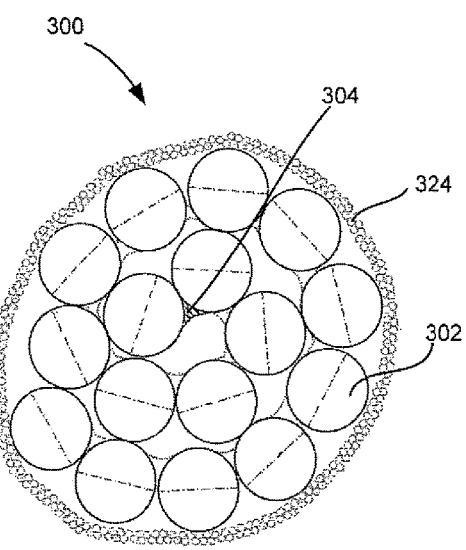
FIG. 6B is a cross-sectional view of another rolled multi-fiber cable, in accordance with an embodiment of the present disclosure.
Figure 6C:
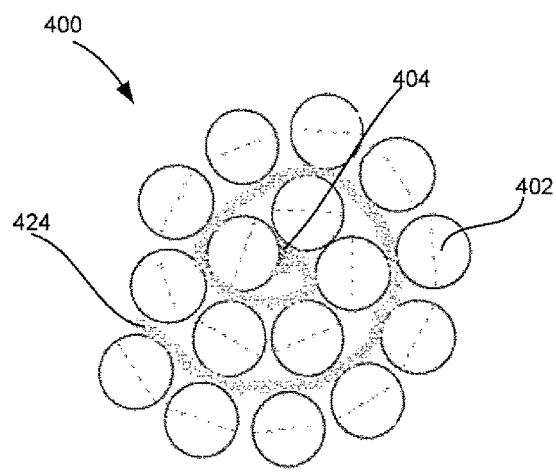
FIG. 6C is a cross-sectional view of another rolled multi-fiber cable, in accordance with an embodiment of the present disclosure.

In another example, FIG. 6B, the strength member 324 may surround the exterior of the multi-fiber cable 300. The strength member 324 may be a woven sheet that can be wrapped around the multi-fiber cable 300. In some instances, the plurality of optical fibers 302 may be rolled, as shown, such that the multi-fiber cable 300 is substantially cylindrical. After the plurality of optical fibers 302 has been rolled, the strength member may be added to the exterior surface of the multi-fiber cable 300. The strength member 324 may create an outer surface around the multi-fiber cable 300. As can be seen in the cross-section taken transverse to the longitudinal length of multi-fiber cable 300, there may be only one location of adhesive 304.

In some instances, the woven sheet of strength members may be coupled to the plurality of optical fibers prior to the optical fibers being rolled into a multi-fiber cable. For example, in FIG. 6C, the plurality of optical fibers 402 may be have adhesive 404 applied in a continuous or substantially continuous manner. The woven sheet of strength members 424 may then be coupled to the plurality of optical fibers 402. The woven sheet of strength members 424 may be coupled to the plurality of optical fibers 402 via adhesive 404. In some instances, strength member 424 may be coupled to the plurality of optical fibers 402 using an additional adhesive or glue, different from adhesive 404. In yet another example, the strength member may be pre-fabricated with an adhesive different from adhesive 404. The adhesive may be kept as "B-stage," in which the adhesive may not be completely cured but is also not liquid. Thus, the B-stage adhesive may be pressed against the plurality of optical fibers 402 and cured once on the plurality of optical fibers 402. Once the strength member 424 is adhered to the plurality of optical fibers 402, the optical fibers may be rolled, as shown, such that the multi-fiber cable 400 is substantially cylindrical. As can be seen in the cross-section taken transverse to the longitudinal length of multi-fiber cable 400, there may be only one location of adhesive 404.

Figure 6D:
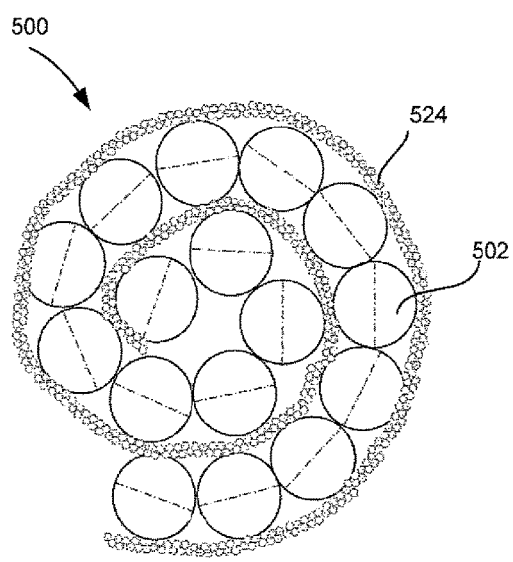
FIG. 6D is a cross-sectional view of another rolled multi-fiber cable, in accordance with an embodiment of the present disclosure.

In another example, FIG. 6D, there may not be any adhesive applied to the plurality of optical fibers 502. The woven sheet of strength members 524 may be adhered or coupled to the plurality of optical fibers 502. For example, the woven sheet of strength members 524 may be coupled to the plurality of optical fibers 502 using an adhesive or glue. The adhesive may be similar to adhesive 104, 204, 304, 404. However, the adhesive or glue might be a different adhesive or glue than adhesive 104, 204, 304, 404. This may allow the spacing between adjacent optical fibers 502 to be minimized for the tightest fiber to fiber contact. For example, the plurality of optical fibers 502 may be rolled, as shown. Each of the plurality of optical fibers 502 may be in contact with each adjacent optical fiber as there may not be any adhesive between them. Thus, the diameter of the multi-fiber cable 500 may be minimized.

Strength members may help prevent accidental damage to the multi-fiber cable. For example, the strength member may help with preventing a single optical fiber from being separated from the multi-fiber cable. In some instances, the strength member may distribute the force exerted on the multi-fiber cable as it is being installed. Most damage to the multi-fiber cable may happen when the multi-fiber cable is being pulled around something, for example equipment, or when something is dropped on the multi-fiber cable. When the multi-fiber cable is being pulled or installed, the force exerted on the multi-fiber cable may, for example, be along the longitudinal length of the multi-fiber cable. However, in some instances, the force exerted on the multi-fiber cable may also be in a direction transverse to the longitudinal length of the cable. The strength member may prevent damage in these situations.

Figure 7A:
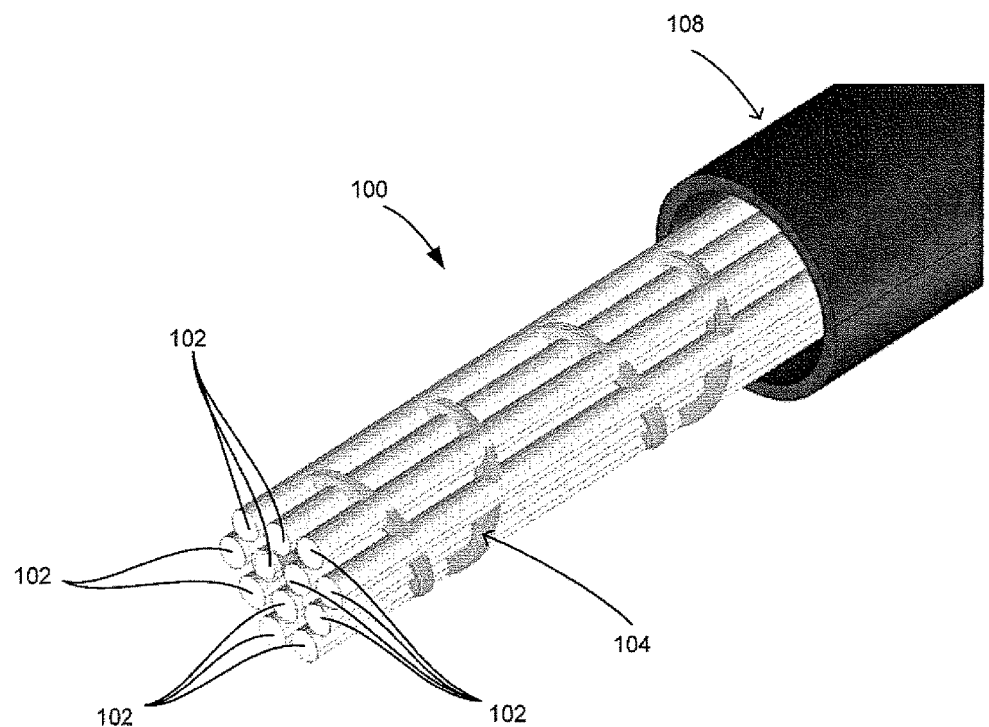
FIG. 7A is a perspective view of a rolled multi-fiber cable with an outer sheath, in accordance with an embodiment of the present disclosure.
Figure 7B:
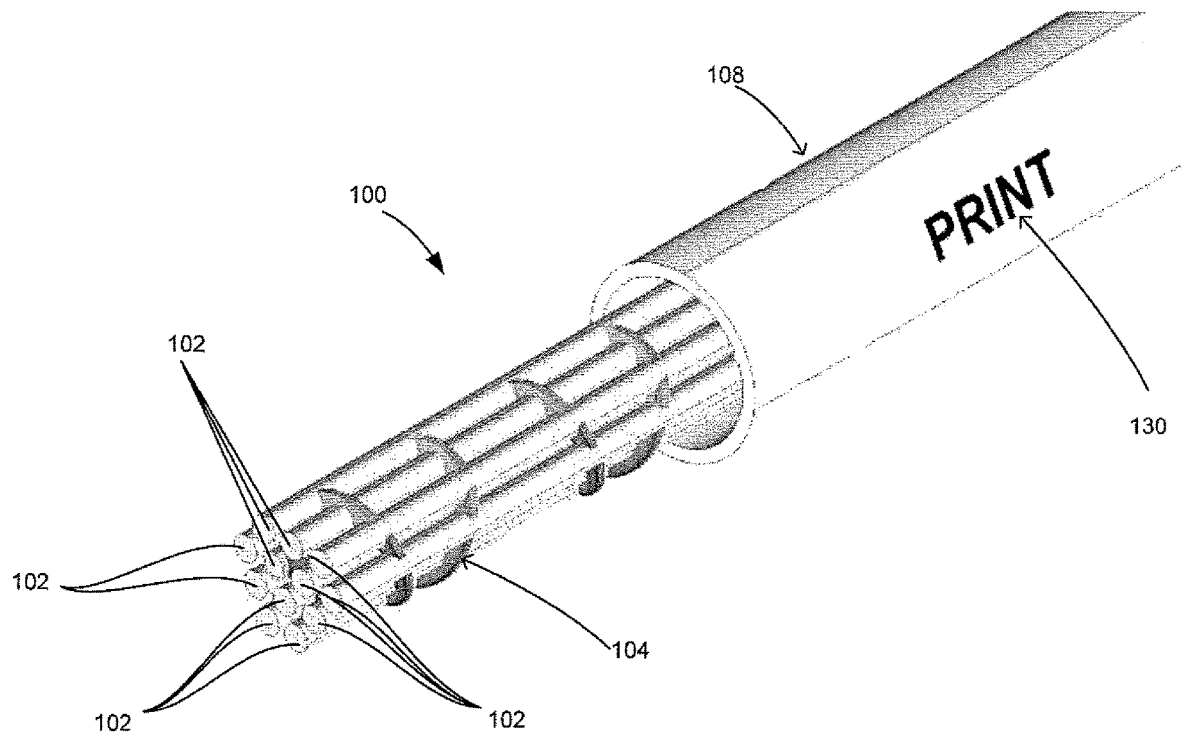
FIG. 7B is a perspective view of another rolled multi-fiber cable with an outer sheath, in accordance with an embodiment of the present disclosure.

FIGS. 7A and 7B show a multi-fiber cable including an outer sheath. For example, after the plurality of optical fibers 102 are rolled such that they form a cylindrical or substantially cylindrical shape, the multi-fiber cable 100 may be inserted into an outer sheath 108. The outer sheath 108 may provide, for example, additional protection against accidental damage. In some examples, the outer sheath 108 may be made of PVC or polyethylene or similar materials. The outer sheath 108 may be configured to include print 130. The print 130 may be decided upon or designed by the purchaser or user of the multi-fiber cable 100.

Figure 8:
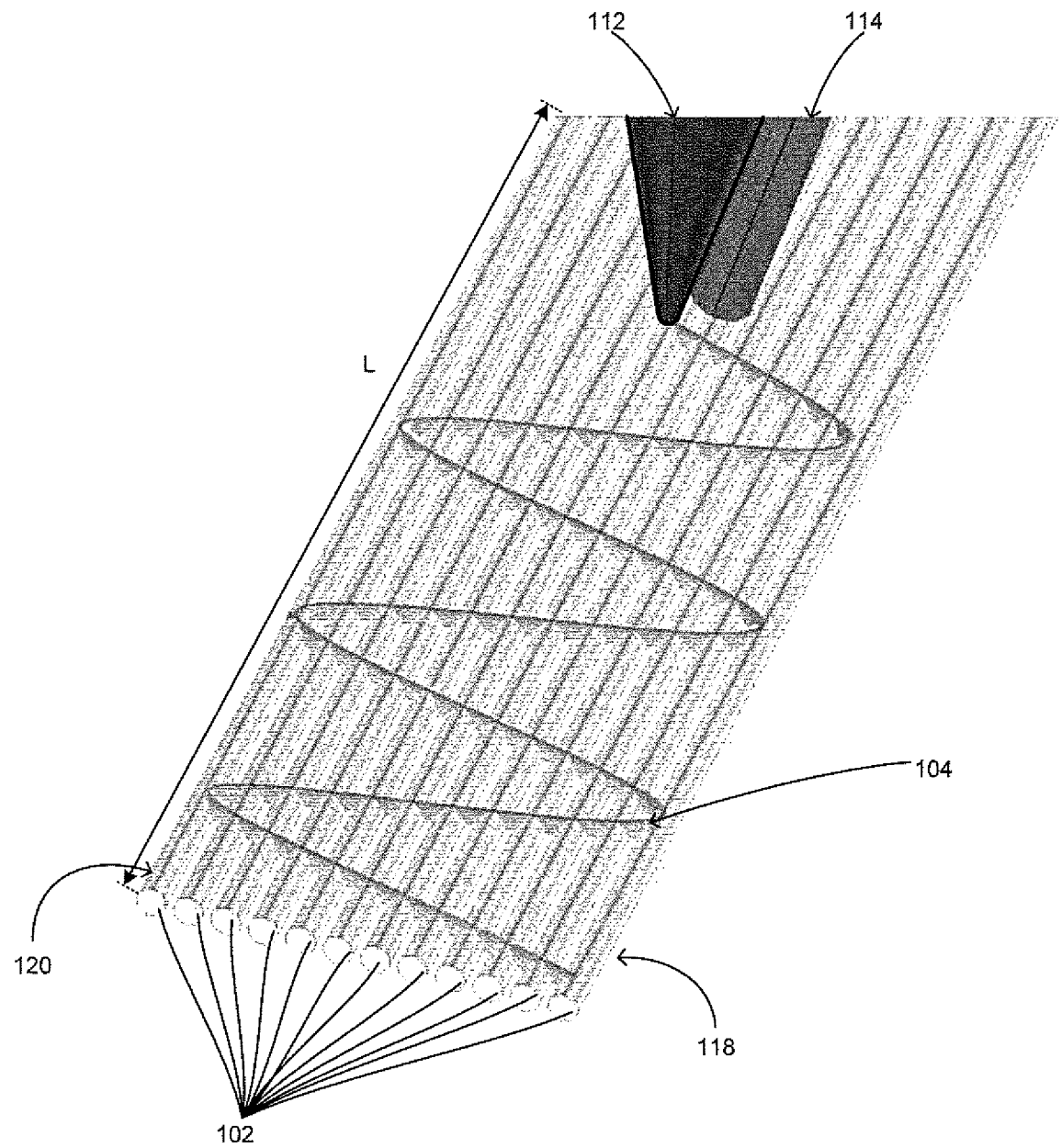
FIG. 8 is a perspective view of a system for making the multi-fiber cable, in accordance with an embodiment of the present disclosure.

FIG. 8 depicts a system for making the multi-fiber cable. For example, the plurality of optical fibers 102 may be arranged such that the longitudinal length of the plurality of optical fibers 102 are parallel or substantially parallel. A dispenser 112 may be used to apply the adhesive 104 to the plurality of optical fibers 102. The dispenser 112 may include a piezo mechanism to control the amount of adhesive that is dispensed.

The dispenser 112 may move along an axis transverse to the longitudinal length "L" of the plurality of optical fibers 102. For example, the dispenser 112 may move back and forth between the first outermost optical fiber 118 and the second outermost optical fiber 120 along the axis transverse to the longitudinal length "L" of the optical fibers 102. Simultaneously, the dispenser 112 may move along the longitudinal length "L" of the optical fibers 102. Thus, as the dispenser 112 moves between the first outermost optical fiber 118 and the second outermost optical fiber 120 and along the longitudinal length "L," adhesive 104 is applied continuously or substantially continuously. According to some examples, the adhesive may be applied discontinuously, as shown in FIGS. 10A, 10B, and 11, such that the adhesive 1004 is a plurality of dots or spots in the cavities 122 between adjacent optical fibers 102. The resulting shape of the adhesive 104 may be a curved shape along the longitudinal length "L" of the cable. The curved shape may be, for example, sinusoidal or substantially sinusoidal.

Alternatively, the dispenser 112 may only move back and forth between the first outermost optical fiber 118 and the second outermost optical fiber 120 along the axis transverse to the longitudinal length of the optical fibers 102 and the optical fibers 102 may move along a path parallel or substantially parallel to the longitudinal length "L" of the optical fibers 102. For example, the optical fibers 102 may be on a conveyer belt that moves in the direction of the longitudinal length "L" as the dispenser 112 dispenses the adhesive. Thus, as the dispenser 112 moves between the first outermost optical fiber 118 and the second outermost optical fiber 120 and the plurality of optical fibers 102 move along a path parallel or substantially parallel to the longitudinal length "L," adhesive 104 is applied continuously or substantially continuously. The resulting shape of the adhesive 104 may be a curved shape along the longitudinal length "L" of the cable. The curved shape may be, for example, sinusoidal or substantially sinusoidal.

In some instances, a light guide 114 may be coupled to the dispenser 112. For example, the light guide 114 may be a curing source. In some instances, the light guide 114 may promote the curing of the adhesive 104 quicker or more efficiently than without the light guide 114. By providing curing light, the light guide 114 may limit the spread of the adhesive 104 on the optical fibers 102. In some instances, light guide 114 may prevent the adhesive 104 from spreading into the cavities or spaces between the adjacent optical fibers 102, as the adhesive may cure before it can spread into those spaces. The light guide 114 may or may not be coupled to the dispenser 112. In some instances, the adhesive 104 is cured in a light curing chamber. For example, the entire process of applying the adhesive 104 using dispenser 112 may occur in the light curing chamber and with or without the light guide 114. Alternatively, the adhesive 104 may be applied to the optical fibers 102 outside of the light curing chamber and then transported to the light curing chamber to be cured.

FIG. 11 illustrates a system for making a multi-fiber cable using multiple dispensers. For example, the system may include two dispensers 1012. Each of the dispensers 1012 may be used to apply adhesive 1004 to the plurality of optical fibers 102. The dispensers 1012 may include a piezo mechanism to control the amount of adhesive that is dispensed.

The dispensers 1012 may move along an axis "W" transverse to the longitudinal length "L" of the plurality of optical fibers 102. For example, the dispensers 1012 may move back and forth between the first outermost optical fiber 118 and the second outermost optical fiber 120 along the axis "W" transverse to the longitudinal length "L" of the optical fibers 102. Simultaneously, the dispensers 1012 may move along the longitudinal length "L" of the optical fibers 102. Thus, as the dispensers 1012 moves between the first outermost optical fiber 118 and the second outermost optical fiber 120 and along the longitudinal length "L," adhesive 1004 is applied.

Each of the dispensers 1012 may be offset such that the adhesive 1004 spots dispensed by dispensers 1012 do not align in the axis "W" transverse to the longitudinal length "L" of the plurality of optical fibers 102. Thus, a cross section of the multi-fiber cable 100 may include only a single location of adhesive 1004 coupling two adjacent optical fibers 102.

While not shown, a light guide maybe coupled to each of the dispensers 1012. The light guide may be similar to the light guide 114 described above.

Figure 12:
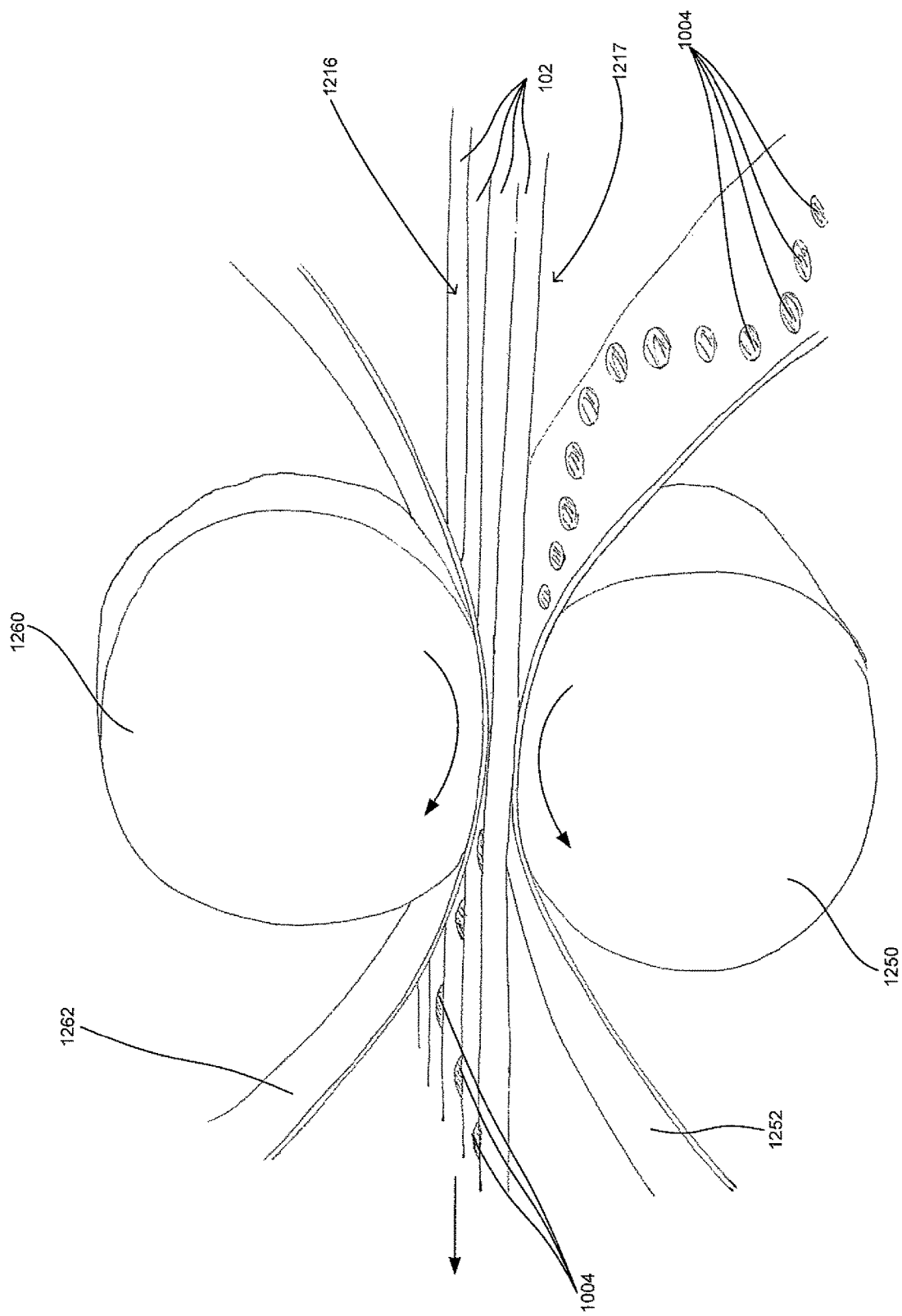
FIG. 12 is a perspective view of yet another system for making the multi-fiber cable, in accordance with an embodiment of the present disclosure.

FIG. 12 illustrates an additional system for applying adhesive to the plurality of optical fibers. The adhesive 1004 spots may be dispensed onto an intermediate material, such as separation tape 1252, instead of onto the plurality of optical fibers 102. For example, the dispensers that dispense adhesive 1004 onto separation tape 1252 may be similar to dispensers 112, 1012 described above. Thus, while the adhesive 1004 is shown as a discontinuous spots forming a continuous or substantially continuous curve, the adhesive may be a continuous or substantially continuous line of adhesive forming a continuous or substantially continuous curve. For example, the adhesive on separation tape 1252 may have the shape of adhesive 104 shown in FIG. 1.

The adhesive 1004 may be dispensed onto separation tape 1252 at any time for use at a later point in time. For example, separation tape 1252 with adhesive 1004 may be made or prepared in large quantities to be stored for use later when making multi-fiber cable 100. In some examples, separation tape 1252 with adhesive 1004 may be made just prior to making multi-fiber cable 100.

Adhesive 1004 may be removably adhered or coupled to separation tape 1252. For example, separation tape 1252 may have a coating that allows adhesive 1004 to be removed such that adhesive 1004 may easily separate from separation tape 1252 and adhere to optical fibers 102 when adhesive 1004 comes in contact with the optical fibers 102. Adhesive 1004 may be removed from separation tape 1252 without leaving a residue on separation tape 1252.

To create multi-fiber cable 100, separation tape 1252 with adhesive 1004 may be fed through a pair of rollers 1250, 1260 simultaneously with the plurality of optical fibers 102. Separation tape 1252 with adhesive 1004 may be fed through rollers 1250, 1260 such that the surface of separation tape 1252 with adhesive 1004 is in contact with bottom surface 1217 of the plurality of optical fibers 102. Rollers 1250, 1260 may provide pressure or exert a force on the separation tape 1252 and optical fibers 102. For example, roller 1260 may exert a downward force on separation tape 1252 and optical fibers 102 and roller 1250 may exert an upward force on separation tape 1252 and optical fibers 102 such that the separation tape 1252 and optical fibers 102 are pushed together. The amount of pressure or force exerted by rollers 1250, 1260 on separation tape 1252 and optical fibers 102 may not exceed a threshold. The threshold may be determined based on the size or thickness of the optical fibers 102. Exceeding the threshold may result in breaking the optical fibers 102. Thus, the pressure or force exerted by roller 1250, 1260 may be enough to transfer adhesive 1004 from separation tape 1252 to optical fibers 102 without breaking optical fibers 102.

The adhesive 1004 on separation tape 1252 may be transferred or to the plurality of optical fibers 102. For example, separation tape 1252 may be pressed onto bottom surface 1217 of the plurality of optical fibers 102 such that the adhesive 1004 is transferred to the bottom surface 1217 due to the pressure or force exerted by rollers 1250, 1260. In some examples, the adhesive 1004 may be pressed into the cavities between each of the adjacent pairs of optical fibers.

Upon exiting rollers 1250, 1260, separation tape 1252 is no longer coupled or adhered to adhesive 1004 and, therefore, may be removed.

According to some examples, a second separation tape 1262 may or may not be fed through rollers 1250, 1260 simultaneously with separation tape 1252 and optical fibers 102. The second separation tape 1262 may be in contact with the top surface 1216 of optical fibers 102. The second separation tape 1262 may not have adhesive 1004 dispensed on it. In some examples, separation tape 1262 may be used as a prevention mechanism. For example, separation tape 1262 may prevent adhesive 1004 from being pushed through the cavities between each pair of optical fibers 102. Thus, adhesive 1004 may not come in contact with roller 1260, if adhesive 1004 is pushed through the cavities between the optical fibers 102. This may allow for less frequent cleanings as roller 1260 may not come in contact with adhesive 1004. In some examples, separation tape 1262 may have a coating or may be made of a material such that adhesive 1004 does not adhere to separation tape 1262.

Figure 9:
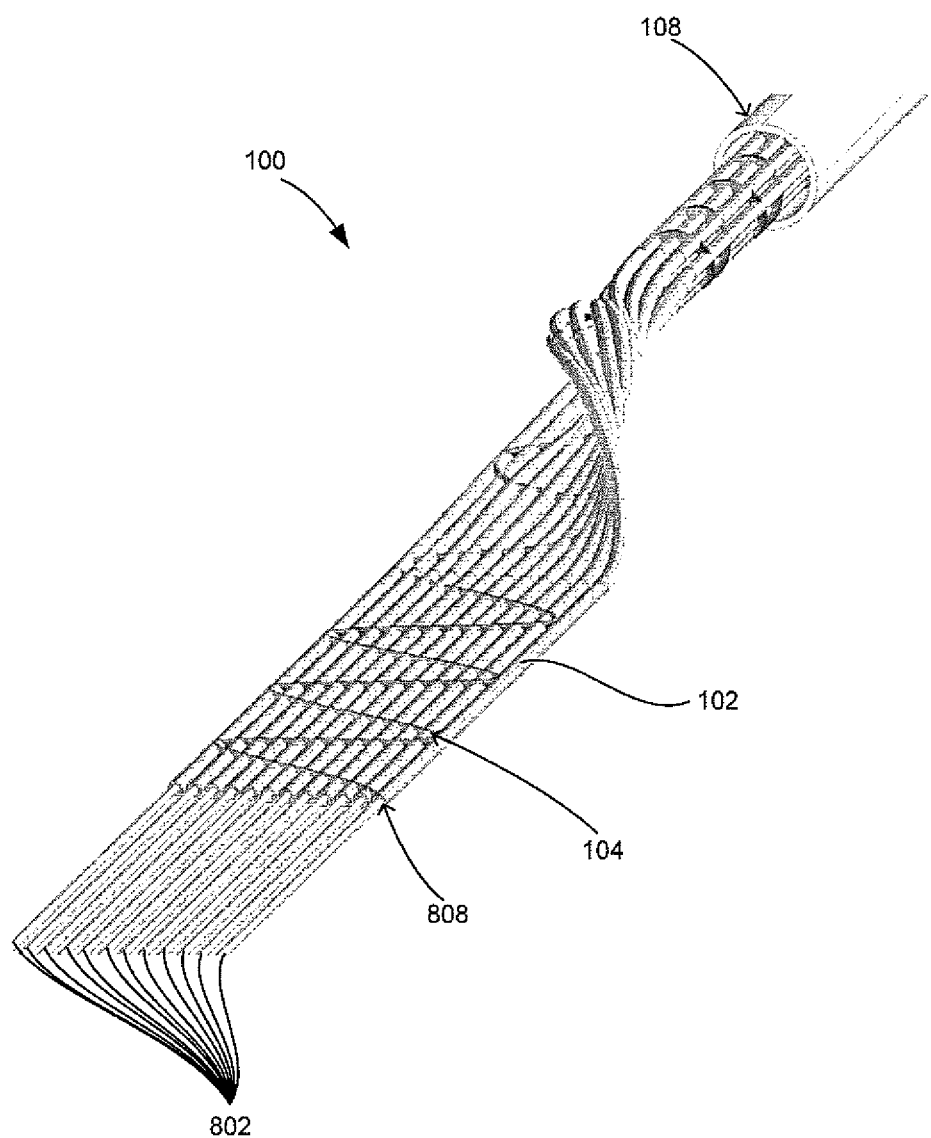
FIG. 9 is a perspective view of a multi-fiber cable, in accordance with an embodiment of the present disclosure.

FIG. 9 depicts a multi-fiber cable with some of the outer coating stripped off or removed. For example, the outer coating 808 of each of the plurality of optical fibers 102 of the may be stripped off the optical fiber 102 such that only the inner glass fiber 802 is exposed. There may be only a single location of adhesive 104 at any cross section taken traverse to the longitudinal length of the multi-fiber cable 100. For example, the continuous or substantially continuous curve of adhesive 104 may result in less adhesive on or between the plurality of optical fibers 102. Less adhesive may, for example, require less effort to remove the adhesive to separate each of the plurality of optical fibers 102 from the multi-fiber cable 100 prior to stripping the outer coating 808 off optical fibers 102. It is to be further understood that the disclosure set forth herein includes any possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the technology, and in the technology generally.

Furthermore, although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology. In this regard, the present technology encompasses numerous additional features in addition to those specific features set forth in the claims below. Moreover, the foregoing disclosure should be taken by way of illustration rather than by way of limitation as the present technology is defined by the appended claims.

The invention claimed is:

1. A multi-fiber cable comprising:
a plurality of optical fibers; and
an adhesive applied along a longitudinal length of the multi-fiber cable in a continuous or substantially continuous manner, such that a cross-section of the multi-fiber cable transverse to the longitudinal length will include adhesive coupling no more than two of the optical fibers to each other,
wherein the adhesive is applied in a continuous curved shape along the longitudinal length of the multi-fiber cable, the continuous curved shape being sinusoidal or substantially sinusoidal, and
wherein the adhesive coupling the two of the optical fibers to each other is located in a space between the two of the optical fibers such that the two of the optical fibers are not in contact with each other at least at the cross-section but are each in contact with the adhesive coupling the two of the optical fibers to each other.

2. The multi-fiber cable of claim 1, wherein the optical fibers are arranged in parallel.

3. The multi-fiber cable of claim 1, wherein the multi-fiber cable comprises a first outermost optical fiber positioned at a first outermost position along a direction transverse to the longitudinal length and a second outermost optical fiber positioned at a second outermost position along the direction transverse to the longitudinal length, and wherein the continuous curved shape extends from a first outermost optical fiber to a second outermost optical fiber.

4. The multi-fiber cable of claim 1, wherein the multi-fiber cable is configured to be rolled in a direction transverse to the longitudinal length of the plurality of optical fibers.

5. The multi-fiber cable of claim 4, further comprising an outer sheath.

6. The multi-fiber cable of claim 5, wherein the outer sheath includes printing.

7. The multi-fiber cable of claim 1, further comprising a strength member.

8. The multi-fiber cable of claim 7, wherein the strength member is glass fiber yarn.

9. The multi-fiber cable of claim 1, wherein the adhesive is a polymer.

10. The multi-fiber cable of claim 1, wherein each of the plurality of fibers are 200 um in diameter, and each of the plurality of optical fibers have a center such that a distance from a first center of a first optical fiber to a second center of a second optical fiber is 250 um.

11. A method of forming a multi-fiber cable, comprising:
arranging a plurality of optical fibers; and
applying, by a dispenser, an adhesive along a longitudinal length of the plurality of optical fibers in a continuous or substantially continuous manner, such that a cross-section of the multi-fiber cable transverse to the longitudinal length will include adhesive coupling no more than two of the optical fibers to each other,
wherein applying the adhesive further includes applying the adhesive in a continuous curved shape along the longitudinal length of the cable, the continuous curved shape being sinusoidal or substantially sinusoidal, and
wherein the adhesive coupling the two of the optical fibers to each other is located in a space between the two of the optical fibers such that the two of the optical fibers are not in contact with each other at least at the cross-section but are each in contact with the adhesive coupling the two of the optical fibers to each other.

12. The method of claim 11, further comprising rolling the plurality of optical fibers in a direction transverse to the longitudinal length of the plurality of optical fibers.

13. The method of claim 11, wherein the multi-fiber cable comprises a first outermost optical fiber, positioned at a first outermost position along a direction transverse to the longitudinal length and a second outermost optical fiber positioned at a second outermost position along the direction transverse to the longitudinal length, and wherein the continuous curved shape extends from a first outermost optical fiber to a second outermost optical fiber.

14. A system for forming a multi-fiber cable, comprising:
an adhesive dispenser configured to apply adhesive to a plurality of optical fibers in a continuous or substantially continuous sinusoidal or substantially sinusoidal curved shape along the longitudinal length of the cable, such that a cross-section of the multi-fiber cable transverse to the longitudinal length will include adhesive coupling no more than two of the optical fibers to each other, wherein the adhesive coupling the two of the optical fibers to each other is located in a space between the two of the optical fibers such that the two of the optical fibers are not in contact with each other at least at the cross-section but are each in contact with the adhesive coupling the two of the optical fibers to each other; and
a curing device for curing the adhesive.

15. The system of claim 14, wherein the curing device is a light guide coupled to the adhesive dispenser.

16. The system of claim 14, wherein the curing device is a light chamber.

17. The system of claim 14, wherein the multi-fiber cable comprises a first outermost optical fiber, positioned at a first outermost position along a direction transverse to the longitudinal length and a second outermost optical fiber positioned at a second outermost position along the direction transverse to the longitudinal length, and wherein the continuous curved shape extends from a first outermost optical fiber to a second outermost optical fiber.

18. A multi-fiber cable comprising:
a plurality of optical fibers arranged in parallel, the plurality of optical fibers having a first outermost optical fiber, positioned at a first outermost position along a direction transverse to a longitudinal length and a second outermost optical fiber positioned at a second outermost position along the direction transverse to the longitudinal length; and
an adhesive applied along the longitudinal length of the multi-fiber cable in a continuous or substantially continuous manner, such that a cross-section of the multi-fiber cable transverse to the longitudinal length will include adhesive coupling no more than two of the optical fibers to each other,
wherein the adhesive is applied in a continuous curved shape along the longitudinal length of the multi-fiber cable, the continuous curved shape being sinusoidal or substantially sinusoidal and extending from a first outermost fiber to a second outermost optical fiber, and
wherein the adhesive coupling the two of the optical fibers to each other is located in a space between the two of the optical fibers such that the two of the optical fibers are not in contact with each other at least at the cross-section but are each in contact with the adhesive coupling the two of the optical fibers to each other.

19. The multi-fiber cable of claim 18, wherein the multi-fiber cable is configured to be rolled in a direction transverse to the longitudinal length of the plurality of optical fibers.

20. The multi-fiber cable of claim 18, further comprising an outer sheath.

21. The multi-fiber cable of claim 18, further comprising a strength member.

22. A multi-fiber cable comprising:
a plurality of optical fibers comprising a first outermost optical fiber positioned at a first outermost position along a direction transverse to a longitudinal length and a second outermost optical fiber positioned at a second outermost position along the direction transverse to the longitudinal length; and
an adhesive applied along the longitudinal length of the multi-fiber cable such that a cross-section of the multi-fiber cable transverse to the longitudinal length will include adhesive coupling no more than two of the optical fibers to each other,
wherein the adhesive is applied in a periodic pattern along the longitudinal length of the multi-fiber cable, a first outermost adhesive is applied between the first outermost optical fiber and a first adjacent fiber and a second outermost adhesive is applied between the second outermost optical fiber and a second adjacent fiber, and
wherein the adhesive coupling the two of the optical fibers to each other is located in a space between the two of the optical fibers such that the two of the optical fibers are not in contact with each other at least at the cross-section but are each in contact with the adhesive coupling the two of the optical fibers to each other.

23. The multi-fiber cable of claim 22, wherein each of the plurality of fibers are 200 um in diameter, and each of the plurality of optical fibers have a center such that a distance from a first center of a first optical fiber to a second center of a second optical fiber is 250 um.

* * * * *